United States Patent
Dong

(10) Patent No.: US 12,232,216 B2
(45) Date of Patent: Feb. 18, 2025

(54) DATA PACKET TRANSMISSION METHOD AND DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 390 days.

(21) Appl. No.: 17/642,038

(22) PCT Filed: Sep. 11, 2019

(86) PCT No.: PCT/CN2019/105447
§ 371 (c)(1),
(2) Date: Mar. 10, 2022

(87) PCT Pub. No.: WO2021/046772
PCT Pub. Date: Mar. 18, 2021

(65) Prior Publication Data
US 2022/0408241 A1    Dec. 22, 2022

(51) Int. Cl.
*H04W 8/22* (2009.01)
*H04L 1/1812* (2023.01)
*H04W 28/086* (2023.01)

(52) U.S. Cl.
CPC ............. *H04W 8/22* (2013.01); *H04L 1/1816* (2013.01); *H04W 28/0864* (2023.05)

(58) Field of Classification Search
CPC .. H04W 8/22; H04W 28/0864; H04L 1/1816; H04L 1/1877
See application file for complete search history.

(56) References Cited

U.S. PATENT DOCUMENTS

| | | | | |
|---|---|---|---|---|
| 2010/0202384 | A1* | 8/2010 | Baker | H04W 52/0229 370/329 |
| 2020/0120603 | A1* | 4/2020 | Seok | H04W 52/0222 |
| 2021/0399838 | A1* | 12/2021 | Lou | H04L 1/08 |
| 2022/0014311 | A1* | 1/2022 | Chitrakar | H04L 5/0055 |
| 2022/0149991 | A1* | 5/2022 | Gan | H04L 1/1896 |

FOREIGN PATENT DOCUMENTS

| | | |
|---|---|---|
| CN | 101076971 A | 11/2007 |
| CN | 104982049 A | 10/2015 |
| CN | 108631958 A | 10/2018 |
| EP | 2341685 A1 | 7/2011 |
| WO | 2015/013889 A1 | 2/2015 |

OTHER PUBLICATIONS

Shellhammer, "Harq Complexity," IEEE 802.11-19/1080r0 (Jul. 2019).

* cited by examiner

*Primary Examiner* — Brian S Roberts
(74) *Attorney, Agent, or Firm* — Volpe Koenig

(57) ABSTRACT

In a data packet transmission method disclosed herein, a capability information value indicating an amount of data that can be supported by a data transmission end is determined. In response to determining that a data packet is not received correctly, a data packet to be retransmitted is determined and is retransmitted according to the capability information value.

20 Claims, 5 Drawing Sheets

DATA PACKET TRANSMISSION METHOD AND DEVICE

CROSS REFERENCE TO RELATED APPLICATIONS

The present application is a U.S. National Stage of International Application No. PCT/CN2019/105447, filed on Sep. 11, 2019, the contents of all of which are incorporated herein by reference in their entireties for all purposes.

BACKGROUND

In order to improve the access rate, the throughput and the like of a wireless local area network (WLAN) technology such as wireless fidelity (Wi-Fi), the IEEE802.11 establishes an SG (study group) IEEE802.11be to study the next-generation mainstream (IEEE802.11a/b/g/n/ac/ax) Wi-Fi technology.

In the next-generation mainstream (IEEE802.11a/b/g/n/ac/ax) Wi-Fi technology, an automatic repeat request (ARQ) mechanism is adopted between an access point (AP) and a station (STA) to carry out data packet transmission. In a data packet transmission process, when a received data packet cannot be parsed and then is directly discarded, the data packet needs to be retransmitted by adopting the same modulation and coding scheme (MCS) mode, and compared with a hybrid automatic repeat request (HARQ) mechanism, the throughput is reduced to a certain extent. In order to meet the requirement of high throughput in 802.11be, a method for carrying out data transmission by adopting an HARQ mechanism in 802.11be needs to be provided.

SUMMARY

In order to solve the problems in the related art, the disclosure provides a data packet transmission method and device.

According to a first aspect of the example of the disclosure, a data packet transmission method is provided and includes: determining a capability information value supported by a data transmission end and determining and retransmitting a data packet according to the capability information value in response to determining that a data packet is not received correctly.

According to a second aspect of the example of the disclosure, a data transmission device is provided and includes: a processor; and a memory, configured to store processor executable instructions; the processor is configured to: determine a capability information value supported by a data transmission end; and determine and retransmit a data packet according to the capability information value in response to determining that a data packet is not received correctly.

According to a third aspect of the example of the disclosure, a non-transitory computer-readable storage medium is provided. Instructions in the storage medium, when executed by a processor of a computer, cause the computer to: determine a capability information value supported by a data transmission end; and determine and retransmit a data packet according to the capability information value in response to determining that a data packet is not received correctly.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this description, illustrate examples consistent with the disclosure and together with the description serve to explain the principles of the disclosure.

DETAILED DESCRIPTION

Figure 1:
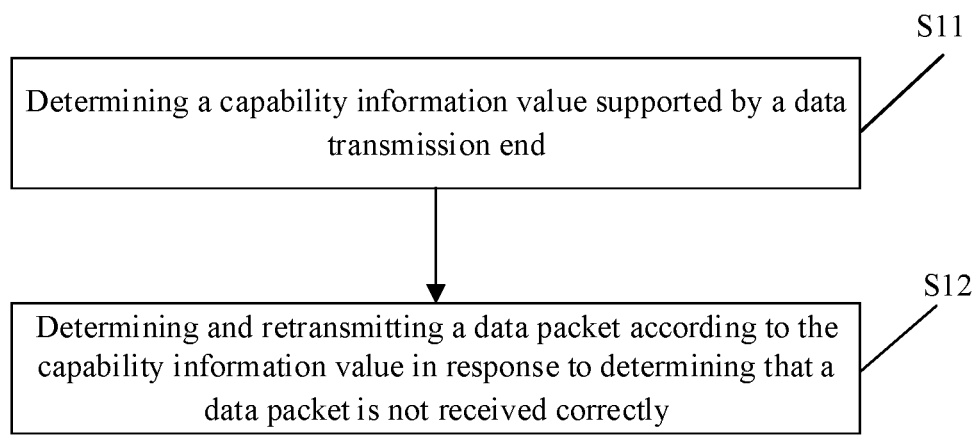
FIG. 1 is a flowchart of a data packet transmission method shown according to an example.

Examples will be described in detail herein and are illustrated in the accompanying drawings. When the following description refers to the accompanying drawings, the same numbers in different drawing figures represent the same or similar elements unless otherwise indicated. The implementations described in the following examples do not represent all possible implementations consistent with the disclosure. On the contrary, they are merely examples of a device and a method consistent with some aspects of the disclosure as detailed in the appended claims.

The disclosure relates to the technical field of communication, in particular to a data packet transmission method and device. A data packet transmission method provided by the disclosure is applied to a wireless local area network communication system including at least one STA and one AP. Data packet transmission is carried out between the STA and the AP. The STA involved in the disclosure may be understood as a user terminal in a wireless local area network. The user terminal may be called user equipment (UE), a mobile station (MS), a mobile terminal (MT) and the like, and is a device for providing a user with voice and/or data connectivity. For example, the terminal may be a handheld device, a vehicle-mounted device and the like with a wireless connection function. At present, some examples of the terminal include a mobile phone, a pocket personal computer (PPC), a palmtop computer, a personal digital assistant (PDA), a notebook computer, a tablet personal computer, a wearable device, an internet of things (IoT) client or a vehicle-mounted device. The AP involved in the disclosure refers to a device, a router and the like through which a wireless local area network user terminal accesses a network.

In the related art, the IEEE802.11 standard is used for data packet transmission between the STA and the AP. At present, the IEEE802.11 establishes an SG (study group) IEEE802.11be to study the next-generation mainstream (802.11a/b/g/n/ac/ax) Wi-Fi technology. The study scope is 320 MHz bandwidth transmission, aggregation and collaboration of multiple frequency bands and the like. The proposed vision of IEEE802.11be is to improve the rate and throughput by at least four times compared with the existing IEEE802.11ax. The application scenarios of IEEE802.11be are video transmission, AR, VR and the like. The aggregation and collaboration of multiple frequency bands refers to simultaneous communication between devices in the 2.4 GHz, 5.8 GHz and 6-7 GHz frequency bands. For simultaneous communication between devices in multiple frequency bands, a new MAC (Media Access Control) mechanism needs to be defined for management.

In order to improve the throughput of the whole system, an HARQ feedback mechanism is adopted in 802.11be. The HARQ mechanism has a higher requirement on the buffer of the device, which will affect the number of retransmissions.

The buffer size can be determined according to the formula:

$$\text{Memory Size} = D\left(\frac{6}{5}\right)\left(\frac{5(\text{bits per } LLR)}{8(\text{bits per byte})}\right)\left(\frac{10^6}{(1024)^2}\right)T = 0.715DT$$

Where MemorySize is a buffer value of the device, D is the data rate, and T is the duration of the data occupying the medium, for example, as shown in Table 1.

TABLE 1

| Data Rate (Gb/s) | Duration of Data Field (ms) | LLR Memory Size (MB) |
| --- | --- | --- |
| 1 | 1 | 0.7 |
| 5 | 1 | 3.6 |
| 10 | 1 | 7.2 |
| 1 | 5 | 3.6 |
| 5 | 5 | 17.9 |
| 10 | 5 | 35.8 |

It can be seen from Table 1 that the Data Rate times the Duration of the Data Field is equal to the amount of data to be buffered in the memory. The amount of the data amount will greatly influence the buffer of the data transmission end. Considering that the data transmission end possibly carries out data packet transmission simultaneously in the three frequency bands of 2.4 GHz, 5.8 GHz and 6-7 GHz, the requirement for the buffer size at the data transmission end is multiplied, which calls for improvement of the transmission of the data packet in the HARQ mechanism.

Further, the number of retransmissions of the data packet may need to be limited considering the buffering capability of the data transmission end. This is because when the HARQ mechanism is adopted, the retransmission of a data packet is strongly related to the buffering capability of the data transmission end. To address these technical problems, the disclosure provides a data packet transmission method. In the disclosed transmission method, a data packet is determined and retransmitted based on a capacity information value that indicates buffer capacity supported at the data transmission end. So that any buffering constraint at the data transmission end is considered thereby improving the throughput.

FIG. 1 is a flowchart of a data packet transmission method according to an example. As shown in FIG. 1, the data packet transmission method is used in an STA or an AP and includes the following steps. Step S11 is determining a capability information value supported by a data transmission end, which is an indication of the amount of data that can be buffered at the transmission end. In the context of this disclosure, the data transmission end may be a STA or an AP. The STA and the AP can convey the capability information value supporting the HARQ mechanism in the association process, so that the capability information value of the data transmission end can be determined when a data packet is transmitted. The capability information value may be the maximum amount of data supporting the HARQ feedback at the data transmission end, which can be considered when transmitting the data packet. The capability information value may also be the maximum buffer value supported at the data transmission end.

In one example, when the data transmission end is an AP, a capability information value can be carried by one or more of a beacon frame, a probe request response frame, an association request response frame and an authentication frame. A capability information value supported by the AP is determined based on at least one of: the beacon frame, the probe request response frame, the association request response frame and the authentication frame. For example, the capability information value is carried in a beacon frame, a probe request response frame, an association request response frame and an authentication frame. The capability information value supported by the AP can be subsequently determined based on the beacon frame, the probe request response frame, the association request response frame and the authentication frame.

In another example, when the data transmission end is an STA a capability information value can be carried in one or more of a probe request frame, an association request frame and an authentication frame. A capability information value supported by the STA is determined based on at least one of: the probe request frame, the association request frame and the authentication frame. For example, a capability information value is carried in a probe request frame and an association request frame. In that case, the capability information value supported by the STA can be subsequently determined based on the probe request frame and the association request frame.

Step S12 is determining and retransmitting a data packet according to the capability information value in response to determining that a data packet is not received correctly. In response to the data packet being not received correctly, it can be determined that the data packet needs to be retransmitted to ensure the reliability of data transmission. In one implementation, in response to determining that the data packet is not received correctly and before the data packet is retransmitted, the retransmitted data packet can be determined according to the capability information value. The retransmitted data packet in the disclosure may be understood as a to-be-retransmitted data packet.

In one example, in response to determining the retransmitted data packet, the maximum number of the retransmissions of the retransmitted data packet is determined. The determination is based on the network transmission quality and the maximum amount of data supporting HARQ feedback at the data transmission end. The maximum number of retransmissions is included in the capability information value. The method includes determining whether a number of retransmissions of the retransmitted data packet is less than or equal to the maximum number of retransmissions.

Furthermore, in response to determining the maximum number of retransmissions, the network transmission quality can be debugged. Under a set network transmission quality, the maximum number of the retransmissions of the retransmitted data packet is set inversely proportional to the maximum amount of data included in the capability information value. For example, given a specific network communication environment quality, the smaller the amount of data, the larger the set number of retransmissions. The larger the amount of data, the smaller the set number of retransmissions.

Furthermore, before the retransmitted data packet is retransmitted a number of retransmissions of the retransmitted data packet that can be supported by buffering at the data transmission end needs to be determined. The number of retransmissions of the retransmitted data packet that is supported by buffering on the data transmission end can be determined based on the maximum buffer value supported by the data transmission end and included in the capability information value signifying capability of the data transmission end. Furthermore, the number of retransmissions of the retransmitted data packet is determined by combining the maximum buffer value and the maximum amount of data included in the capability information value.

Figure 2:
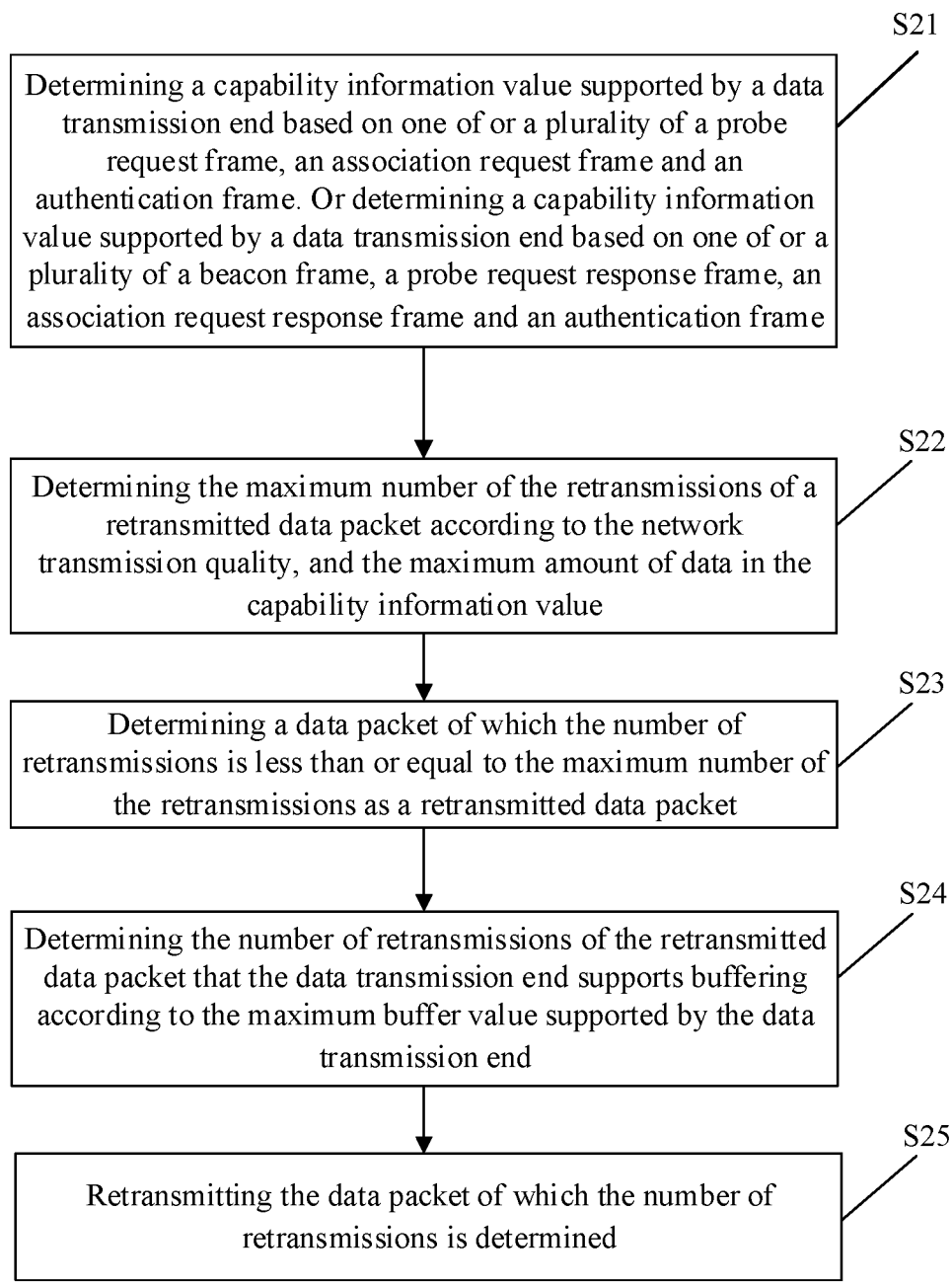
FIG. 2 is a flowchart of a data packet transmission method shown according to an example.

After the number of retransmissions of the data packet is determined, the retransmitted data packet can be transmitted. The flow of the data packet transmission method will be briefly explained below in a graphical representation. FIG. 2 is a flowchart of a data packet transmission method shown in an example. Referring to FIG. 2, the data packet transmission method includes the following steps.

Step S21 is determining a capability information value supported by a data transmission end based on at least one of: a probe request frame, an association request frame and an authentication frame. Or, determining a capability information value supported by a data transmission end can be based on at least one of: a beacon frame, a probe request response frame, an association request response frame and an authentication frame.

Step S22 is determining the maximum number of retransmissions of a retransmitted data packet according to the network transmission quality and the maximum amount of data in the capability information value. Step S23 is determining a data packet of which the number of retransmissions is less than or equal to the maximum number of the retransmissions as a retransmitted data packet. Step S24 is determining the number of retransmissions of the retransmitted data packet for which the data transmission end supports buffering based on the maximum buffer value supported by the data transmission end. Step S25 is retransmitting the data packet.

The data packet can be retransmitted via a retransmission data frame. In the context of the present disclosure, the retransmission data frame may be understood as a data frame for retransmitting the data packet. In order to distinguish the retransmission data frame from other data frames, a retransmission data frame identification bit may be set in the retransmission data frame. The retransmission data frame is identified through the retransmission data frame identification bit.

In one implementation, a medium access control management protocol data unit (MPDU) subframe may be used as a retransmission data frame. In other words, the data packet is retransmitted via the MPDU subframe. When the data packet to is retransmitted via the MPDU sub-frame, the data packet is retransmitted in the MPDU part of the MPDU sub-frame, according to the format shown in FIG. 3. Furthermore, a reserved bit (Reserved) of an MPDU delimiter is used as a retransmission data frame identification bit, so that the MPDU sub-frame is identified as a retransmission data frame.

For example, the retransmission data frame can be indicated by the Reserved setting of the MPDU delimiter. The format of the MPDU delimiter may be a non-directional multi-gigabit (non-DMG) format, or a directional multi-gigabit (DMG) format. The format of the MPDU delimiter is specifically shown in FIG. 3.

Figure 4:
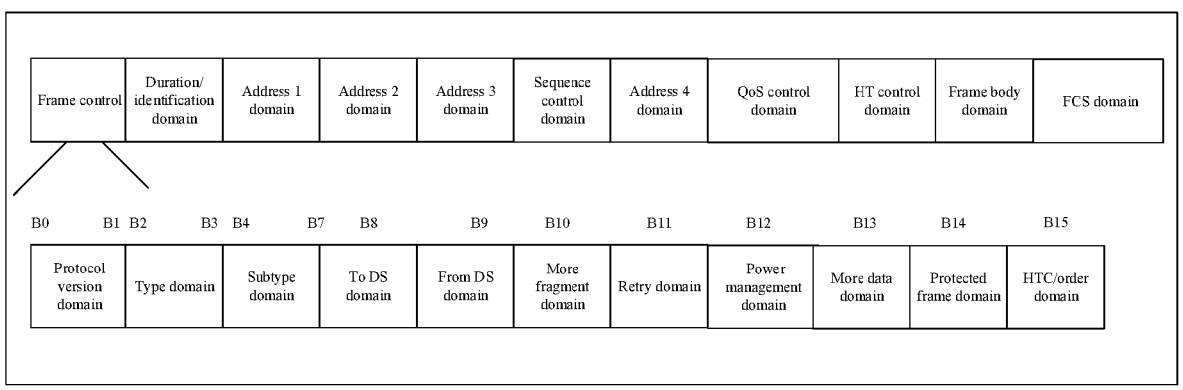
FIG. 4 is a schematic diagram of a retransmission data frame shown according to an example.

In another implementation, the MAC frame may be used as a retransmission data frame. In other words, the data packet is conveyed by the MAC frame. When the data packet is conveyed by the MAC frame, a retransmission data frame identification bit may be set in MAC frame header information. The format of a MAC frame header is shown in FIG. 4. In one example, a retry bit (retry) of the MAC frame header may be set as a retransmission data frame identification bit. The retransmission data frame is identified by a retry setting. For example, when the retry setting is 1 the MAC frame is identified as the retransmission data frame. The data packet can be retransmitted at a transmission opportunity (TXOP). The data packet can be retransmitted in a single frequency band. The data packet can also be retransmitted in multiple frequency bands.

Figure 3:
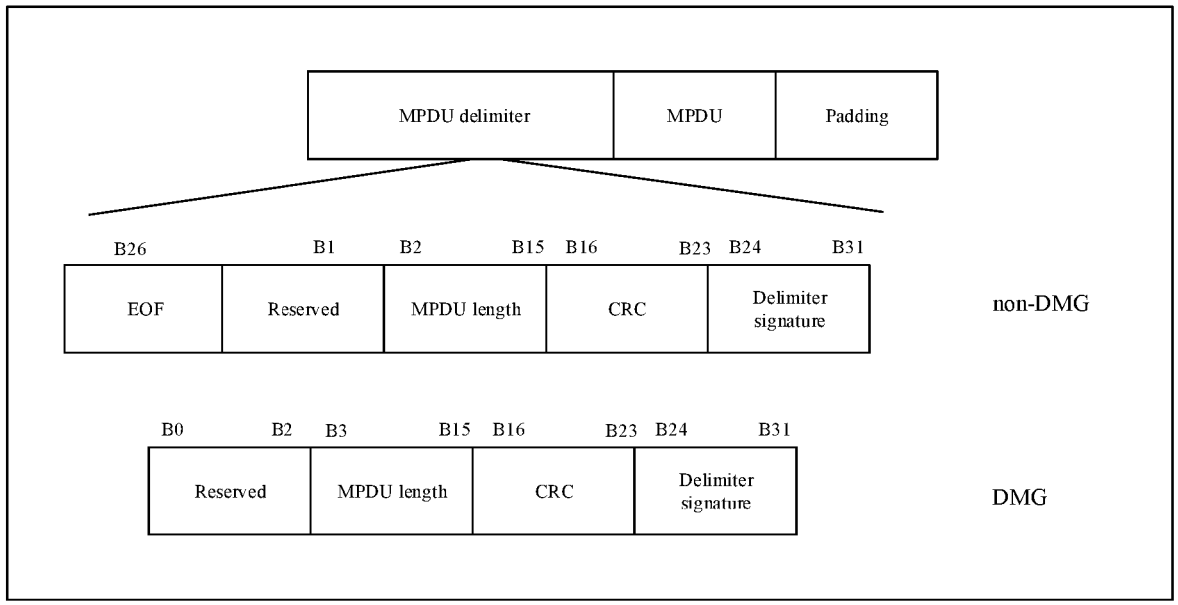
FIG. 3 is a schematic diagram of a retransmission data frame shown according to an example.

In some examples of the disclosure the retransmission occurs in a single frequency band. In order to retransmit the data packet in the single frequency band, continuous data packets are retransmitted in the single frequency band at a TXOP. The data transmission end determines a to-be-transmitted data packet to be retransmitted, and transmits the determined data packet to be retransmitted in a retransmission data frame including a header bit, used for transmitting continuous data packets in a retransmission data frame. The retransmission data frame for retransmitting the data packet can have an MPDU subframe structure, as shown in FIG. 3. The retransmission data frame is identified through a reserved bit of the MPDU subframe as shown in FIG. 3.

In other examples of the disclosure, the data packet is retransmitted in multiple frequency bands. In order to retransmit the data packet in multiple frequency bands, based on the to-be-transmitted data packet to be retransmitted, receiving conditions in each of the frequency bands (considering the buffering capability for data transmission) is determined. The data packet is retransmitted via a retransmission data frame in a frequency band other than the original frequency band of the retransmitted data packet. In other words, the data packet can be retransmitted in another frequency band.

In the disclosure, the transmitted data packet may be a single data packet or multiple continuous data packets. If a data packet retransmitted in multiple frequency bands is a single data packet, a retransmission data frame may be a MAC frame as shown in FIG. 4, wherein retry in the MAC frame header is set to 1. If a data packet retransmitted in multiple frequency bands comprises continuous data packets, a retransmission data frame may be an MPDU subframe as shown in FIG. 3. Furthermore, if the data packet is retransmitted in multiple frequency bands the retransmission data frame further includes a frequency band identification bit. The frequency band identification bit is used for identifying the frequency band for retransmitting the determined data packet to be retransmitted.

According to an example of the disclosure, the HARQ mechanism is adopted in the data packet transmission. The retransmitted data packet is determined based on the amount of data and the buffer value, so that the buffering constraints at the data transmission end can be accounted for and the throughput can be improved.

The technical solution provided by the example of the disclosure can include the following beneficial effects: when the data packet is not received correctly, the data packet is determined and retransmitted according to the capability information value supported by the data transmission end, so that the data packet transmission using an HARQ mechanism is realized, and the throughput of the whole system is improved.

Based on the same concept, an example of the disclosure further provides a data transmission device. It can be understood that in order to achieve the above-mentioned functions, the data transmission device provided by the example of the disclosure includes hardware structures and/or software modules for correspondingly executing the various functions. In combination with the units and algorithm steps of each example disclosed herein, the disclosure can be implemented in a hardware form or a hardware and computer software combination form. Whether a certain function is executed in a hardware mode or a computer software-driven hardware mode depends on the specific application and design constraint conditions of the technical solution. Those skilled in the art can use different methods to implement the described functions for each specific application, but this implementation should not be considered to exceed the scope of the technical solution of the example of the disclosure.

Figure 5:
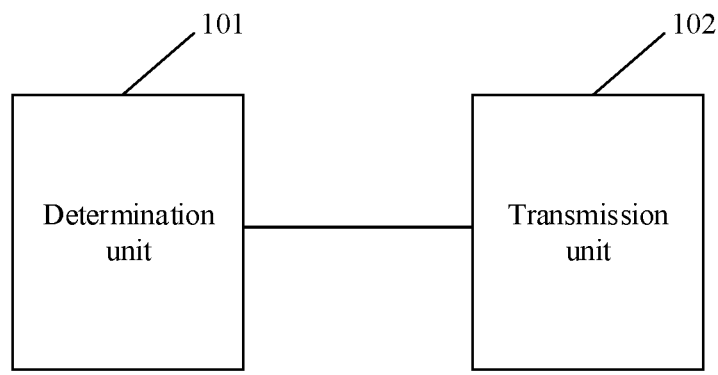
FIG. 5 is a block diagram of a data packet transmission device shown according to an example.

FIG. 5 is a block diagram of a data packet transmission device shown according to an example. Referring to FIG. 5, the device 100 includes a determination unit 101 and a transmission unit 102. The determination unit 101 is configured to determine a capability information value supported by a data transmission end, and to determine a data packet based on the capability information value, in response to determining that a data packet is not received correctly. The transmission unit 102 is configured to retransmit the data packet.

In one implementation, the data transmission end is an access point. In that case, the determination unit 101 is configured to determine a capability information value supported by the data transmission end based on at least one of: a beacon frame, a probe request response frame, an association request response frame and an authentication frame. In another implementation, the data transmission end is a station. In that case, the determination unit 101 is configured to determine a capability information value supported by the data transmission end based on at least one of: a probe request frame, an association request frame and an authentication frame.

In another implementation, the capability information value includes a maximum amount of data supporting HARQ feedback. In that case, the determination unit 101 is configured to determine a retransmitted data packet according to the capability information value by determining the maximum number of the retransmissions of the retransmitted data packet according to the network transmission quality and the maximum amount of data included in the capability information value. In this case, under the set network transmission quality, the maximum number of the retransmissions of the retransmitted data packet is inversely proportional to the maximum amount of data included in the capability information value. In this implementation the determination unit 101 is configured to determine a data packet of which the number of retransmissions is less than or equal to the maximum number of the retransmissions as a retransmitted data packet.

In another implementation, the capability information value further includes a maximum buffer value supported by the data transmission end. In that case, the determination unit 101 is further configured to determine the number of retransmissions of the retransmitted data packet that the data transmission end supports buffering according to the maximum buffer value supported by the data transmission end before the transmission unit 102 retransmits the data packet. In another implementation, the transmission unit 102 is configured to retransmit a data packet through a retransmission data frame, and the retransmission data frame includes a retransmission data frame identification bit used for identifying the retransmission data frame.

In another implementation, the retransmission data frame is an MPDU subframe, and the retransmission data frame identification bit is a reserved bit in the MPDU subframe. In another implementation, the retransmission data frame is a MAC frame, and the retransmission data frame identification bit is a retry bit in the MAC frame. In another implementation, the data transmission end transmits continuous data packets in a single frequency band. In that case the transmission unit 102 is configured to retransmit the data packet in the retransmission data frame including a header bit used for transmitting continuous data packets in the retransmission data frame.

In another implementation, the data transmission end transmits continuous data packets in multiple frequency bands. In this case, the transmission unit 102 is configured to retransmit the data packet through a retransmission data frame in a frequency band other than the frequency band of the original retransmitted data packet. In another implementation, the retransmission data frame further includes a frequency band identification bit used for identifying the frequency band for retransmitting the determined data packet to be retransmitted.

According to the device in the example, the specific manner for each module to execute operation has been described in detail in the example of the method, and the detail will not be repeated here.

Figure 6:
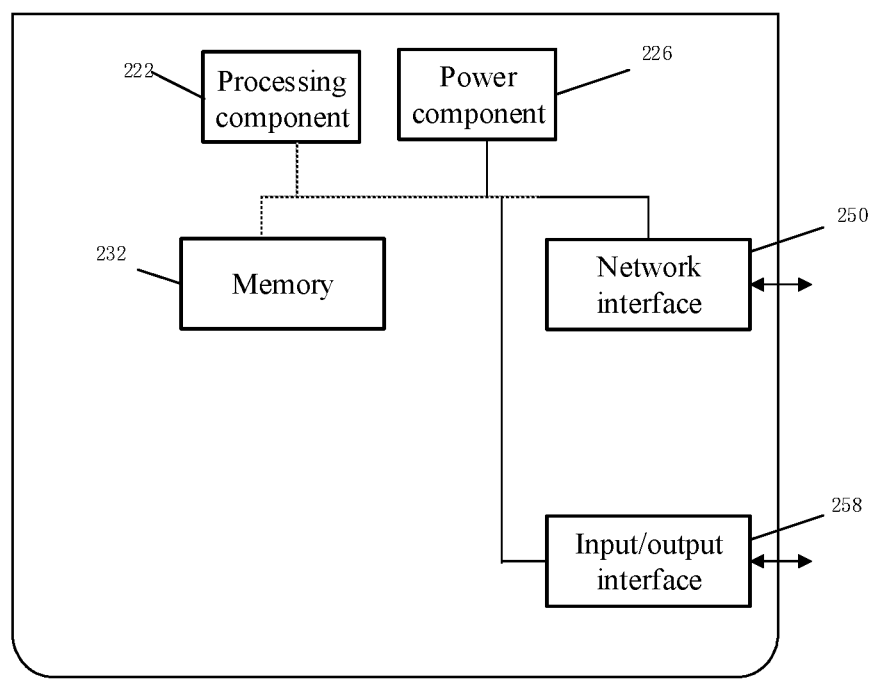
FIG. 6 is a block diagram of a device shown according to an example.

FIG. 6 is a block diagram of a device 200 for data packet transmission shown according to an example. For example, the device 200 may be provided as a station. Referring to FIG. 6, the device 200 includes a processing component 222 which further includes one or more processors, and memory resources represented by a memory 232 for storing instructions, such as applications, executable by the processing component 222. An application stored in the memory 232 may include one or more modules each corresponding to a set of instructions. Further, the processing component 222 is configured to execute the instructions to perform the above method.

The device 200 may also include a power component 226 configured to perform power management of the device 200, a wired or wireless network interface 250 configured to connect the device 200 to a network, and an input/output (I/O) interface 258. The device 200 can operate based on an operating system stored in the memory 232, such as Windows Server™, Mac OS X™, Unix™, Linux™, FreeBSD™ or the like.

In an example, a non-transitory computer-readable storage medium including instructions is also provided, such as a memory 232 including instructions that are executable by a processing component 222 of the device 200 to implement the above method. For example, the non-transitory computer-readable storage medium may be an ROM, a random access memory (RAM), a CD-ROM, a magnetic tape, a floppy disk, an optical data storage device, or the like.

Figure 7:
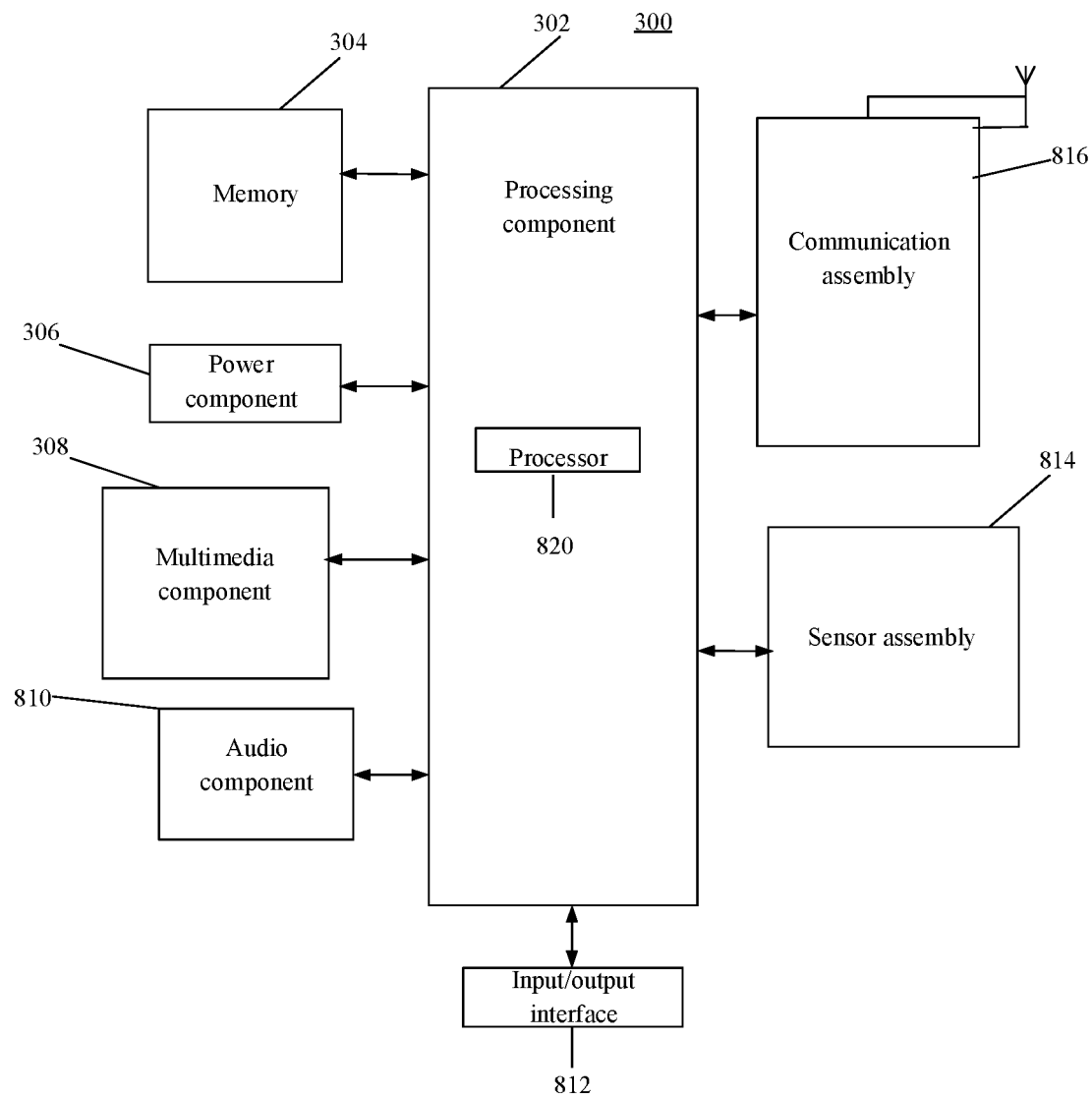
FIG. 7 is a block diagram of a device shown according to an example.

FIG. 7 is a block diagram of a device 300 for data transmission shown according to an example. For example, the device 300 may be an AP. The AP may be a mobile phone, a computer, a digital broadcast terminal, a messaging device, a game console, a tablet device, a medical device, a fitness device, a personal digital assistant, etc.

Referring to FIG. 7, the device 300 may include one or more of the following components: a processing component 302, a memory 304, a power component 306, a multimedia component 308, an audio component 810, an input/output (I/O) interface 812, a sensor component 814, and a communication component 816.

The processing component 302 typically controls overall operations of the device 300, such as operations associated with display, telephone calls, data communications, camera operations, and recording operations. The processing component 302 may include one or more processors 820 to execute instructions to complete all or part of the steps of the above method. Further, the processing component 302 may include one or more modules for facilitating the interaction between the processing component 302 and other components. For example, the processing component 302 may include a multimedia module to facilitate the interaction between the multimedia component 308 and the processing component 302.

The memory 304 is configured to store various types of data to support operation at the device 300. Examples of these data include instructions for any application or method operating on the device 300, contact data, phonebook data, messages, pictures, videos, etc. The memory 304 may be implemented by any type of volatile or non-volatile storage device, or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 306 provides power for various components of the device 300. The power component 306 may include a power management system, one or more power sources, and other components associated with generating, managing, and distributing power for the device 300.

The multimedia component 308 includes a screen that provides an output interface between the device 300 and a user. In some examples, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding, and gestures on the touch panel. The touch sensor can not only sense the boundary of a touch or slide action, but also detect duration and pressure associated with the touch or slide action. In some examples, the multimedia component 308 includes one front-facing camera and/or a rear-facing camera. When the device 300 is in an operating mode, such as a shooting mode or a video mode, the front-facing camera and/or the rear-facing camera can receive external multimedia data. The front-facing camera and the rear-facing camera each may be a fixed optical lens system or have focal length and optical zoom capability.

The audio component 810 is configured to output and/or input an audio signal. For example, the audio component 810 includes a microphone (MIC) configured to receive an external audio signal when the device 300 is in an operating mode, such as a call mode, a recording mode, and a voice recognition mode. The received audio signal may be further stored in the memory 304 or transmitted via the communication component 816. In some examples, the audio assembly 810 also includes a speaker for outputting the audio signal.

The I/O interface 812 provides an interface between the processing component 302 and a peripheral interface module, and the peripheral interface module may be a keyboard, a click wheel, a button and the like. These buttons may include, but are not limited to, a home button, a volume button, a start button, and a lock button.

The sensor assembly 814 includes ones or more sensors for providing various aspects of state evaluation for the device 300. For example, the sensor assembly 814 can detect an on/off state of the device 300, relative positioning of the components, such as a display and keypad of the device 300, and can also detect a change in position of the device 300 or one of the components of the device 300, the presence or absence of user contact with the device 300, or the orientation or acceleration/deceleration of the device 300 and the temperature change of the device 300. The sensor assembly 814 may include a proximity sensor configured to detect the presence of a nearby object without any physical contact. The sensor assembly 814 may also include a light sensor, such as a CMOS or CCD image sensor, for use in imaging applications. In some examples, the sensor assembly 814 may also include an acceleration sensor, a gyroscope sensor, a magnetic sensor, a pressure sensor, or a temperature sensor.

The communication component 816 is configured to facilitate wired or wireless communication between the device 300 and other devices. The device 300 can access a wireless network based on a communication standard, such as WiFi, 2G or 3G, or a combination of them. In one example, the communication component 816 receives broadcast signals or broadcast related information from an external broadcast management system via a broadcast channel. In one example, the communication component 816 also includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the device 300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above method.

In an example, a non-transitory computer-readable storage medium including instructions is also provided, such as a memory 304 including instructions that are executable by a processor 820 of the device 300 to implement the above method. For example, the non-transitory computer-readable storage medium may be an ROM, a random access memory (RAM), a CD-ROM, a magnetic tape, a floppy disk, an optical data storage device, or the like.

In an example, a non-transitory computer-readable storage medium including instructions is also provided, such as a memory 232 including instructions that are executable by a processor of the device 200 to implement the above method. For example, the non-transitory computer-readable storage medium may be an ROM, a random access memory (RAM), a CD-ROM, a magnetic tape, a floppy disk, an optical data storage device, or the like.

It can be understood that "multiple" in the disclosure refers to two or more than two, and other quantifiers are similar. "and/or" describes the association relationship of the associated objects, indicating that there can be three relationships, for example, A and/or B can represent that A exists alone, A and B exist at the same time and B exists alone. Character '/' generally represents that front and rear associated objects have an 'or' relationship. "one", "said" and "this" in singular form are also intended to include a plural form unless the context clearly represents other meanings.

It can be further understood that in the examples of the disclosure, although the operations are described in a specific sequence in the drawings, the operations are not required to be executed according to the specific sequence or a serial sequence, or all the operations are required to be executed to obtain an expected result. In particular environments, multitasking and parallel processing may be advantageous.

Other examples of the present disclosure will be readily conceived by those skilled in the art upon reading the description herein and practicing the disclosure herein. The present application is directed to encompassing any variation, use or adaptive variation of the disclosure that follows the general principles of the disclosure and include the known common knowledge or customary technical means in the art that are not disclosed by the disclosure. The description and examples are considered only exemplary, and the true scope and spirit of the disclosure are indicated by the following claims.

It will be appreciated that the present disclosure is not limited to the exact construction that has been described above and illustrated in the accompanying drawings, and that various modifications and changes may be made without departing from the scope of them. It is intended that the scope of the present disclosure only be limited by the appended claims.

What is claimed is:

1. A method for transmitting a data packet between a station (STA) and an access point (AP), the method comprising:
   determining a capability information value supported by a data transmission end, wherein the capability information value comprises a maximum amount of data supporting hybrid automatic repeat request (HARQ) feedback; and
   in response to determining that the data packet is not received correctly:
      determining a maximum number of retransmissions of the data packet according to a set network transmission quality and a maximum amount of data in the capability information value, wherein under the set network transmission quality, the maximum number of the retransmissions of the data packet is inversely proportional to the maximum amount of data in the capability information value, and
      retransmitting the data packet when a number of retransmissions of the data packet is less than or equal to the maximum number of the retransmissions.

2. The method according to claim 1, wherein the data transmission end is the AP.

3. The method according to claim 2, wherein the determining the capability information value supported by the data transmission end comprises:
   determining the capability information value supported by the data transmission end based on at least one of: a plurality of a beacon frames, a probe request response frame, an association request response frame or an authentication frame.

4. The method according to claim 1, wherein the data transmission end is the STA.

5. The method according to claim 4, wherein the determining the capability information value supported by the data transmission end comprises:
   determining the capability information value supported by the data transmission end based on at least one of: a plurality of a probe request frame, an association request frame or an authentication frame.

6. The method according to claim 1, wherein;
   the capability information value further comprises a maximum buffer value supported by the data transmission end; and
   the method further comprises:
   before retransmitting the data packet, determining a number of retransmissions of the data packet that the data transmission end supports buffering based on the maximum buffer value supported by the data transmission end.

7. The method according to claim 1, wherein the retransmitting the data packet comprises:
   retransmitting the data packet through a retransmission data frame, wherein the retransmission data frame comprises a retransmission data frame identification bit used for identifying the retransmission data frame.

8. The method according to claim 7, wherein the retransmission data frame is a medium access control management protocol data unit (MPDU) subframe, and the retransmission data frame identification bit is a reserved bit in the MPDU subframe.

9. The method according to claim 8, wherein the data transmission end transmits continuous data packets in a single frequency band; and wherein retransmitting the data packet through the retransmission data frame comprises retransmitting the data packet using a header bit, for transmitting continuous data packets in the retransmission data frame.

10. The data packet transmission method according to claim 8, wherein the data transmission end transmits continuous data packets in multiple frequency bands, and wherein retransmitting the data packet through the retransmission data frame comprises retransmitting the data packet through the retransmission data frame of a frequency band other than an original frequency band of the data packet.

11. The method according to claim 10, wherein the retransmission data frame further comprises a frequency band identification bit, and the frequency band identification bit is used for identifying a frequency band for retransmitting the data packet.

12. The method according to claim 7, wherein the retransmission data frame is a media access control (MAC) frame, and the retransmission data frame identification bit is a retry bit in the MAC frame.

13. The data packet transmission method according to claim 12, wherein:
   the data transmission end transmits continuous data packets in multiple frequency bands, and
   the retransmitting the data packet through the retransmission data frame comprises retransmitting the data packet through the retransmission data frame of a frequency band other than an original frequency band of the data packet.

14. The method according to claim 13, wherein the retransmission data frame further comprises a frequency band identification bit, and wherein the frequency band identification bit is used for identifying a frequency band for retransmitting the data packet.

15. The method of claim 1, where the data packet is transmitted between the STA and the AP according to an IEEE 802.11 standard.

16. A device for transmitting a data packet between a station (STA) and an access point (AP), the device comprising:

a memory, configured to store processor executable instructions; and one or more processors that are configured to execute the processor executable instructions, wherein the processor executable instructions cause the one or more processors to collectively:

determine a capability information value supported by a data transmission end, wherein the capability information value comprises a maximum amount of data supporting hybrid automatic repeat request (HARQ) feedback, and in response to a determination that the data packet is not received correctly:

determine a maximum number of retransmissions for the data packet according to a set network transmission quality and a maximum amount of data in the capability information value, wherein under the set network transmission quality, the maximum number of the retransmissions of the data packet is inversely proportional to the maximum amount of data in the capability information value, and retransmit the data packet when a number of retransmissions of the data packet is less than or equal to the maximum number of the retransmissions.

17. The device according to claim 16, wherein the data transmission end is the AP, and wherein the processor executable instructions further cause the one or more processors to collectively:

determine the capability information value supported by the data transmission end based on at least one of: a plurality of a beacon frame, a probe request response frame, an association request response frame or an authentication frame.

18. The device according to claim 16, wherein the data transmission end is the STA, and wherein the processor executable instructions further cause the one or more processors to collectively:

determine the capability information value supported by the data transmission end based on at least one of: a plurality of a probe request frames, an association request frame or an authentication frame.

19. The device of claim 16, where the data packet is transmitted between the STA and the AP according to an IEEE 802.11 standard.

20. A non-transitory computer-readable storage medium, storing instructions for transmitting a data packet between a station (STA) and an access point (AP), the instructions when executed by one or more processors cause the one or more processors to collectively perform a method comprising:

determining a capability information value supported by a data transmission end, wherein the capability information value comprises a maximum amount of data supporting hybrid automatic repeat request (HARQ) feedback; and in response to determining that the data packet is not received correctly:

determining a maximum number of retransmissions for the data packet according to a set network transmission quality and a maximum amount of data in the capability information value, wherein under the set network transmission quality, the maximum number of the retransmissions of the data packet is inversely proportional to the maximum amount of data in the capability information value, and retransmitting the data packet when a number of retransmissions of the data packet is less than or equal to the maximum number of the retransmissions.

* * * * *

UNITED STATES PATENT AND TRADEMARK OFFICE
CERTIFICATE OF CORRECTION

| | | |
|---|---|---|
| PATENT NO. | : 12,232,216 B2 | Page 1 of 1 |
| APPLICATION NO. | : 17/642038 | |
| DATED | : February 18, 2025 | |
| INVENTOR(S) | : Xiandong Dong | |

It is certified that error appears in the above-identified patent and that said Letters Patent is hereby corrected as shown below:

On the Title Page

In Item (56), under "OTHER PUBLICATIONS", in Column 2, Line 1, delete ""Harq" and insert -- "HARQ --, therefor.

In the Specification

In Column 1, Line 5, delete "APPLICATIONS" and insert -- APPLICATION --, therefor.
In Column 3, Line 18, delete "Where" and insert -- where --, therefor.
In Column 3, Line 18, delete "MemorySize" and insert -- Memory Size --, therefor.
In Column 5, Lines 48-49, delete "medium access control management protocol data unit" and insert -- medium access control protocol data unit --, therefor.
In Column 10, Line 33, delete "ultra wide band" and insert -- ultra-wideband --, therefor.
In Column 10, Line 60, delete "similar." and insert -- similar, --, therefor.
In Column 10, Line 65, delete "relationship." and insert -- relationship, --, therefor.

In the Claims

In Column 12, Line 32, in Claim 10, delete "The data packet transmission method" and insert -- The method --, therefor.
In Column 12, Line 48, in Claim 13, delete "The data packet transmission method" and insert -- The method --, therefor.
In Column 12, Line 3, in Claim 6, delete "wherein;" and insert -- wherein: --, therefor.
In Column 12, Lines 21-22, in Claim 8, delete "medium access control management protocol data unit" and insert -- medium access control protocol data unit --, therefor.
In Column 12, Line 62, in Claim 15, delete "The method of claim" and insert -- The method according to claim --, therefor.
In Column 14, Line 5, in Claim 19, delete "The device of claim" and insert -- The device according to claim --, therefor.

Signed and Sealed this
Twenty-ninth Day of April, 2025

Coke Morgan Stewart
*Acting Director of the United States Patent and Trademark Office*